Dec. 23, 1952 L. J. MOULTON 2,622,402
CONTROL MECHANISM
Filed Feb. 10, 1951 3 Sheets-Sheet 1

INVENTOR.
L. J. MOULTON
BY George M. Soule
ATTORNEY

Fig 4

Patented Dec. 23, 1952

2,622,402

UNITED STATES PATENT OFFICE 2,622,402

CONTROL MECHANISM

Lloyd Jackson Moulton, Mentor, Ohio, assignor to The Marquette Metal Products Company, Cleveland, Ohio, a corporation of Ohio Application February 10, 1951, Serial No. 210,345

10 Claims. (Cl. 60—97)

This invention relates to an improved control mechanism for internal combustion engine driven electric generator systems and particularly such systems as are used to drive the traction motors of locomotive vehicles, thereby indicating the general object. The invention provides a form of unitary control mechanism for the internal combustion engine and its generator so that notwithstanding large variations in traction motor load or power demand, the engine and generator are enabled to operate efficiently within safe load limits and at selectable engine and generator speed suited to those variations.

Another object and feature of the invention is the provision of an improved automatically acting engine shutdown control, the operation of which is normally responsive to engine lubricating oil system failures but which is restrained from operating for a sufficient period to enable routine starting of the engine (e. g. at idling speed) and which also prevents the engine from continuing to operate in the event the lubricating oil system is not functioning properly a predetermined time after starting.

Another object is to provide an improved hydraulically operating, remotely controllable speed setting mechanism for the engine speed governor, which mechanism normally functions to limit the rate at which speed setting adjustment can be effected through remote control while enabling rapid decreased speed adjustments to be effected as required by large changes of speed setting in the decreased speed direction.

The invention further relates to an improved electro-hydraulic mechanism useful for translating relatively weak electric-signal-responsive input motions effected singly and in various combinations into corresponding accurately controlled high strength output motions.

The electro-hydraulic mechanism hereof is adapted to serve the same general purposes as does that of L. J. Moulton application Serial No. 163,115, filed May 20, 1950, entitled "Control Mechanism." Therein the signal-responsive input motions and combinations are permutatively employed to actuate a hydraulic relay including a pilot valve and servomotor for speeder spring adjustment. Present subject solution avoids considerable expense, and has operational advantages which will be explained, through elimination of the pilot valve and servomotor of the relay and by the use of electric-signal-receiving solenoids which operate simple "on"-"off" valves to actuate, for example, a pair of plural piston hydraulic slave motor units. Full stroke operations of the slave motor pistons in turn are permutated through a connected power output member to enable the proper number, sequence and length of speeder spring adjustments necessary for the desired range of speed settings. The strokes of the slave motor pistons are of considerable length and easily adjustable to vary the speeder spring adjustment increments relative to each other within said range with extreme minuteness. The above indicates further objects and special advantages of subject arrangement. Others will become apparent from the following description of the illustrative forms shown in the accompanying drawings, wherein:

The invention as shown is particularly adapted for efficiently and safely controlling the loading adjustments of an internal-combustion-engine-driven electric generator for rail locomotive service as a function of engine speed setting, largely through operation of the engine governor in response to speed change detection thereby in accordance with varying power demands of an electric traction motor or plurality of motors supplied with current by the generator.

Governor and general arrangement

Figures 1, 1A:
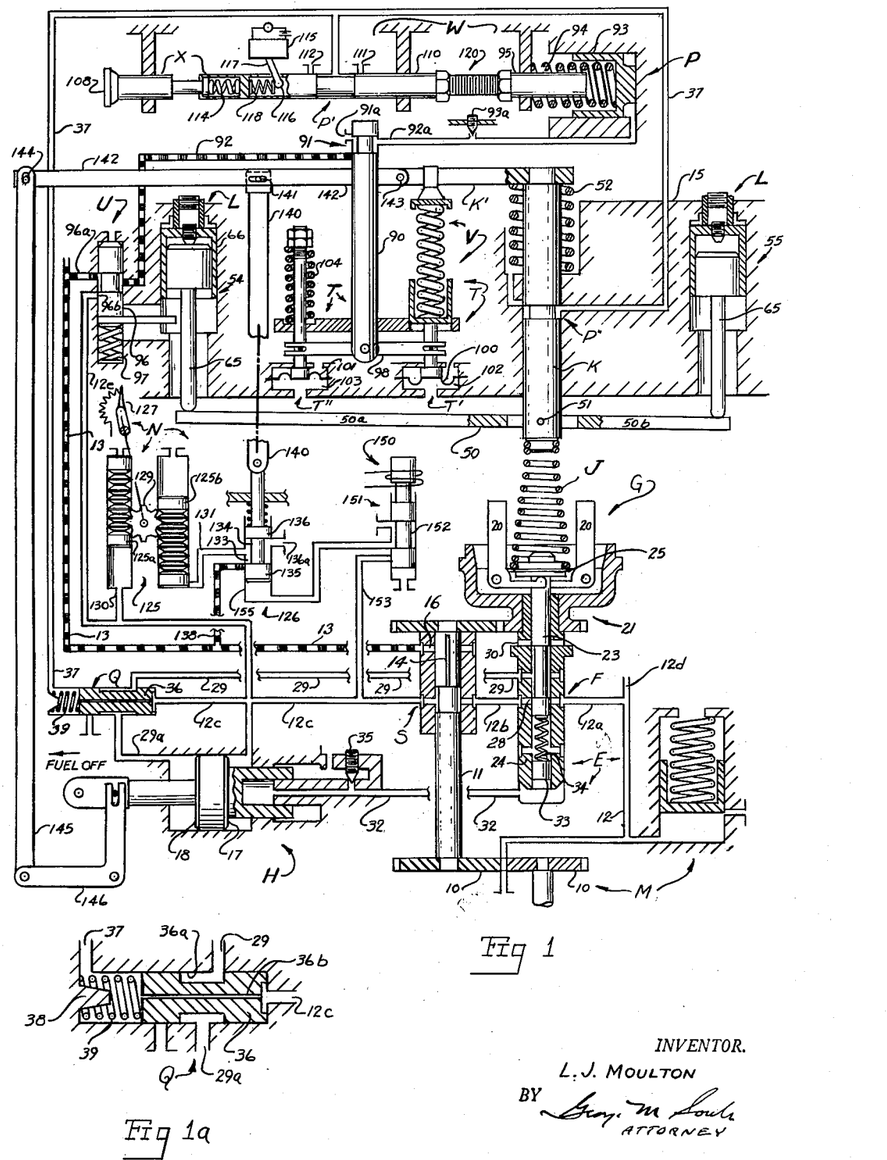
Fig. 1 is a schematic view showing the principal elements of the control mechanism required for safe engine operation by remote control.
Fig. 1A is an enlarged schematic view of an engine shutdown valve.

The engine governor E, as schematically shown particularly by Fig. 1, is of the hydraulic relay type having a compensation system enabling isochronous operation. Speed sensing mechanism G of the governor actuates a pilot valve F for causing operation of fuel regulating servomotor H. Speed setting means includes speeder spring J, vertically guided speeder rod K acting thereon and remotely controllable speeder rod adjusting or actuating means including the twin unit fluid operated speed setting slave motor mechanism L, the components of which move in response to energization and de-energization of solenoids A, B, C, and D through operation of respective valves of mechanism L described later. Mechanism L is shown by itself schematically in Fig. 2. The various mechanisms of Fig. 1 are shown in positions occupied when the engine is in operation at idle or starting speed.

The engine governor E, as shown, has its own fluid pressure supply source (pump and accumulator system M) lower right Fig. 1 which source preferably also supplies fluid to the speed setting mechanism L, electrical load control mechanism N (left center, Fig. 1) and automatic shutdown mechanisms including a two speed hydraulic motor unit P (upper right) fluid venting or dump valve P' and a shutdown valve Q of the governor (lower left) controlled by conjoint action of unit P and valve P' as will be shown. In routine shutdown the valve Q is caused to operate in response to decreased speed setting of speeder spring J through speeder rod K beyond idle by a fluid venting or dump valve P'' of which a portion of the speeder rod can conveniently be an element.

The fluid pressure supply system M includes pump gears 10 one of which drives the speed sensing mechanism G through a lay shaft 11. Main pump and accumulator output line is 12 and all lines continually connected therewith will usually be spoken of as containing "governor oil" (steady flow). A portion of the lay shaft 11 forms part of a spurt valve mechanism S (left of governor pilot valve F), which acts continually during governor operation, by causing continuously supplied slot or slots 14 in the lay shaft to be repeatedly opened and closed in relation to ports 16 connected to line 13, whereby to control the rate at which constant pressure governor oil from line 12 is supplied to 13 for use by several parts of subject mechanism including some if not all of the slave motor components of speed setting mechanism L. During governor operation, the accumulator-connected lines 12a, 12b, and 12c are subjected continuously to governor oil for rapid action of the mechanisms supplied thereby, and spurt output line 13 is subjected to the same pressure but intermittently to permit slow or controlled movement of the mechanisms it supplies.

For engine safety purposes, provision is made for automatic engine shutdown in response to engine lubricating oil system failure of two types. Lubrication system failure detector is mechanism T (upper center, Fig. 1). The two-speed hydraulic motor unit P is arranged for actuation automatically by detector mechanism T for accomplishing engine shutdown by control of shutdown valve Q. The operation of motor unit P when called for by detector mechanism T during idle or no load operation of the engine is delayed for routine starting as well as engine testing purposes by being subjected to spurtwise fluid from the output line 13 of spurt mechanism S (spurt fluid shown by interrupted shading in the lines which extend generally around the left side of the diagram through a fluid rate control valve U, upper left).

The fluid rate control valve U acts as a function of increase engine speed setting somewhat beyond that for idle engine operation, as will be explained to substitute continuous flow governor oil, from line 12e for the spurtwise fluid for fast operation of automatic shutdown motor unit P, hence valve Q.

A low engine lubricating oil pressure sensitive (right hand) motive unit T', of engine lubricating oil system failure detector T requires means to adjust its action in relation to engine speed because for each speed there is a particular minimum safe lubricating oil pressure, the minimum increasing with speed. The necessary adjustment is performed as a function of speed setting by, for example, a lubrication system pressure balancing spring device V connected to speeder rod K. Unit T'' (leftward portion of detector mechanism T) operates in response to excessively high engine lubricating oil pump suction.

An emergency hand shutdown and automatic shutdown alarm switch mechanism W (top Fig. 1) includes as its principal element a compound rod X which either by manual operation or by automatic operation of motor unit P works the dump valve P' of mechanism W to initiate and terminate operation of shutdown valve Q. Speeder-rod-connected fluid dump valve P'' has essentially the same action on valve Q for routine shutdown operation.

*Governor* (Continued)

The speed sensitive mechanism G of governor E includes flyballs 20 on a rotary ballhead assembly 21 driven by lay shaft 11, the flyballs and speeder spring J acting on the plunger 23 of pilot valve F in non-rotating pilot valve sleeve 24. Outward action of the flyballs is opposed by the speeder spring J connected to the pilot valve plunger 23 through a thrust plate assembly 25. Speed setting slave motor mechanism L adjusts the speeder spring J to set the engine speed by a succession of direct actions on speeder rod K. Raising of the rod K results in decreased engine speed settings and lowering of the rod results in increased speed settings.

Hydraulic fluid from output line 12 of the pump and accumulator system M (governor oil) is continually admitted to the relatively smaller piston area 17 of the governor servomotor H through continually interconnected output line portions 12a, 12b, 12c. In the illustrated neutral or equilibrium position of the governor pilot valve plunger 23, fluid (regulating oil) in line 29 29a is trapped in contact with the larger area side 18 of the servomotor piston. "Fuel on" (rightward) movement of the servomotor piston results from downward pilot valve plunger movement admitting governor oil through ports 28 of pilot valve sleeve 24 to line 29, 29a and the larger piston side 18, and "Fuel off" (leftward) movement results from upward movement of said valve plunger, thereby spilling trapped regulating oil from line 29 to governor sump through port 30 of the pilot valve sleeve.

Feedback from the governor servomotor to the pilot valve F for isochronous governor operation is a function of servo-action-pumping of compensation fluid through line 32 to and from the working chamber of a receiving compensation piston 33. Piston 33 is attached to the pilot valve plunger 23 by a coil spring 34 for two-way action on the plunger. An adjustable leak-off for compensation fluid is indicated at 35 in line 32.

*Shutdown valve mechanism*

The governor shutdown valve Q, as shown in Figs. 1 and 1a, is a spring biased, spool-like shuttle plug 36 in a working cylinder or chamber 36a one end of which is connected to governor oil branch 12c, the opposite end being connected to a vent line 37 leading to the dump valves P' and P''. The chamber between the two ends of plug 36 normally forms a portion of trapped governor regulating oil line 29, 29a communicating with the governor servomotor H at its larger piston face. A restricted vent hole 36b through the plug 36 normally equalizes governor oil pressure on the two ends of the plug; but when pressure is relieved in line 37 by the opening of either dump valve P' or P'' the plug moves to the right against the force of the biasing spring 39 until the vent hole is approximately closed by stop 38. The described motion of the plug first closes the line 29 leading from the valve Q to the governor pilot valve F and then vents the trapped fluid through 29a from adjacent the larger side 18 of the servomotor piston causing engine shutdown action as will be apparent. Approximate closure of the vent hole 36b by stop 38 insures retention of governor oil pressure in the accumulator system for a substantial period of time but due to slight leakage does not interfere with reestablishment of equalized governor oil pressure at the two ends of the plug 36 for enabling the spring 39 to return the plug to its normal position when the dump valve (whichever was opened) has been closed.

Modified shutdown valve mechanism

Figure 4:
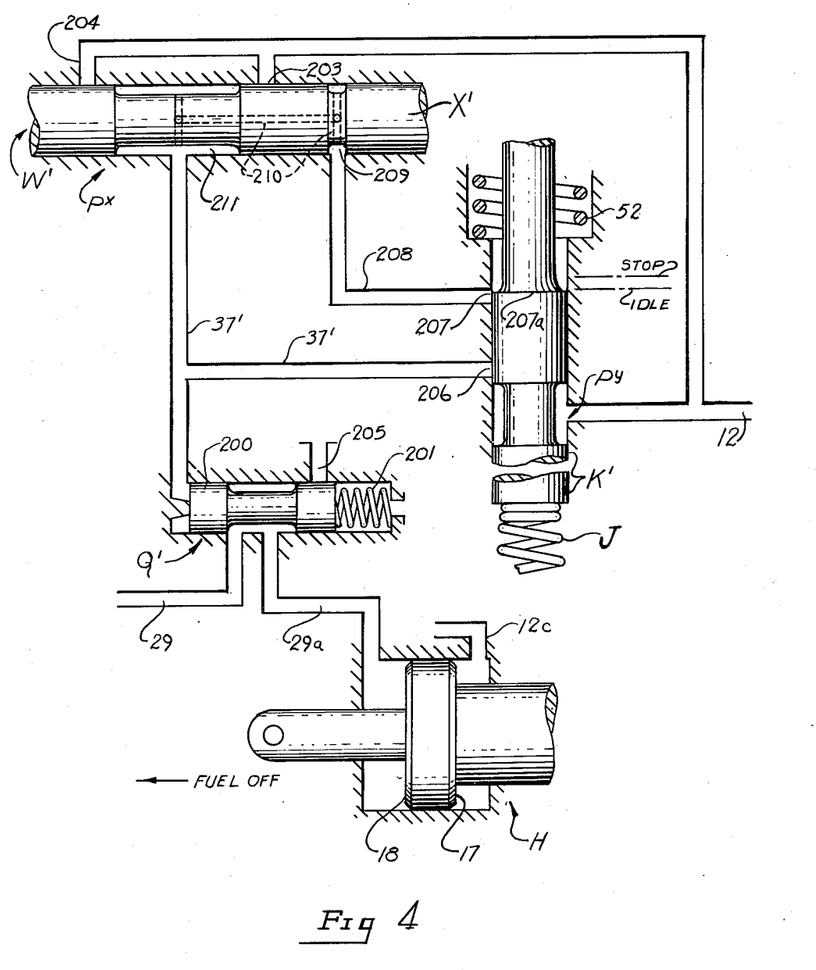
Fig. 4 is a schematic view showing a modified engine shutdown control system which can be used in place of that shown in Fig. 1.

To avoid the possibility of premature depletion of governor oil in the accumulator system during shutdown operation (such as might occur in case the stop 38 of valve Q described above should fail approximately to close the vent hole 36b for any reason) the mechanism according to Fig. 4 may be substituted for valve Q and actuating means for it (i. e. principally dump valves P' and P''). In the modified arrangement a piston and valve forming plunger 200 of shutdown valve Q' has a biasing spring 201 normally holding the plunger in its illustrated position whereby the governor regulating fluid line 29, 29a is open for normal governor control of the servomotor H. The line 37' and connected ducts normally contain fluid at negligible pressure and the shutdown-demanding operations of valves Px and Py (corresponding respectively to P' and P'' of Fig. 1) pressurizes the line 37' to cause movement of plunger 200 to its shutdown-effecting position (not shown) by which regulating fluid line portion 29 is first closed and line portion 29a is then vented to sump at 205 to cause the governor servomotor to move to engine-shutdown position.

Valve Px of automatic and manual shutdown mechanism W' is quite similar in arrangement and operation to valve P' of Fig. 1 except that normally closed ports 203 and 204 of valve Px are suitably connected to governor oil line 12 (accumulator pressure) instead of operating as vent ports as do the corresponding port elements (111 and 112 more fully described later) shown in Fig. 1. Similarly port 206 of speeder-rod-operated valve Py is appropriately connected to accumulator pressure line 12 instead of being a vent port. Ports 203 and 204 are opened by axial movement of rod X in either direction as already described to effect engine shutdown. Port 206 is opened by speeder rod K' to accomplish shutdown whenever the speeder rod is raised to its "stop" position (next above that in which K' is illustrated).

After operation of plunger 200 to its shutdown position wherein the governor regulating fluid is spilled said valve has to be returned to its initial position before the engine can be restarted. To insure such return of the plunger 200 the line 37' is vented to sump through a port 207 by a valving edge 207a of the speeder rod K' when the speeder rod is in any other than its "stop" position. Port 207 communicates through line 208 with a short recess 209 around the shutdown rod X' continually connected as by drillings 210 with the valve chamber 211 of valve Px. When shutdown is called for by movement of rod X' in either direction the usually then open port 207 is nullified by closing communication between the valve chamber 211 and vent line 208 at 209 before the opening of either port 203 or 204 can cause pressurization of line 37'.

Speed setting mechanism (L)

Figures 2, 3:
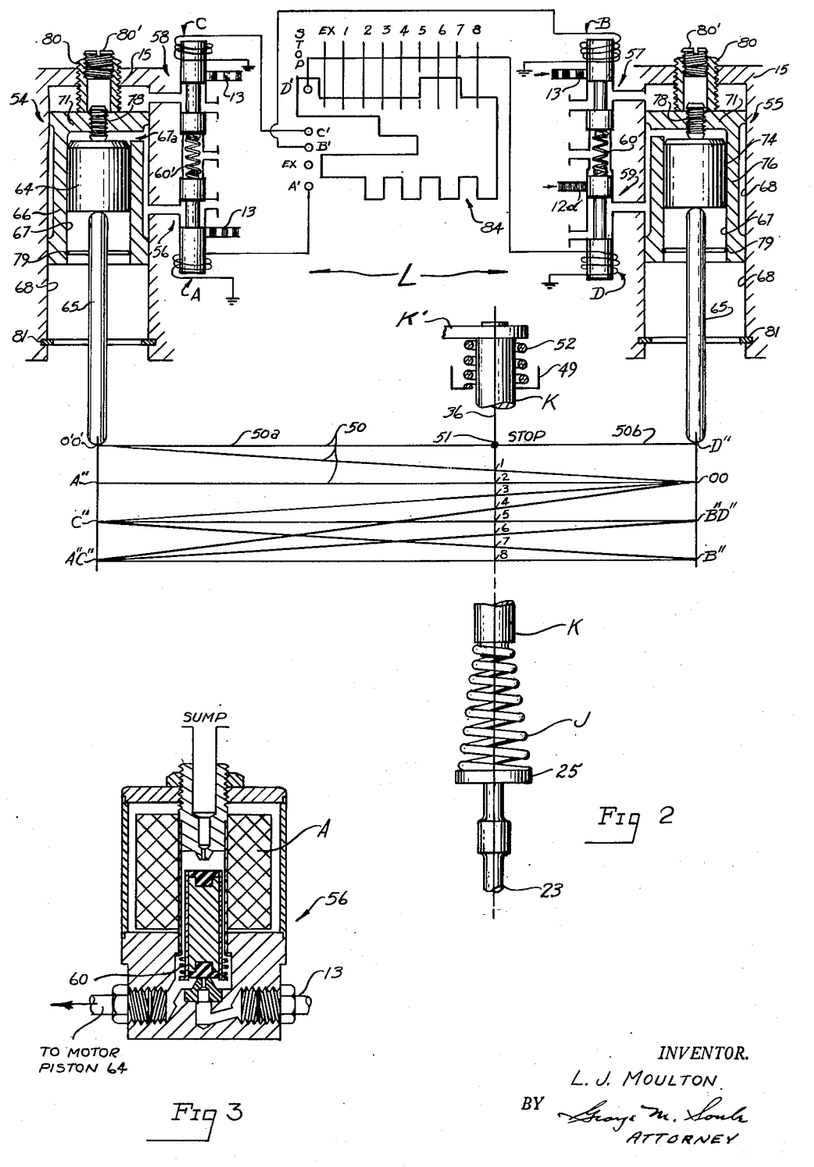
Fig. 2 is a schematic view showing the governor speed adjusting fluid operated slave motor mechanism only hereof as arranged for actuation by a known type of electric control which is also shown.
Fig. 3 is a sectional, somewhat diagrammatic view of a form of slave motor control valve adapted for actuation electro-magnetically in a low current circuit.

Referring particularly to Fig. 2, subject signal impulse permutation system for stepwise precision adjustment of the speeder spring J by fluid power comprises in part, as shown schematically, a floating differential lever 50 pivotally connected as at a point 51 to the speeder rod K. The pivotal connection need not fasten the parts together but that is preferred arrangement.

The required small incremental speed adjusting movements of rod K result from a combination of stepwise input adjustments at two or more points on the floating differential lever 50. The input adjustments in one direction are effected by action of fluid pressure, and in the return direction preferably by spring means in order to minimize the fluid capacity requirement of the system. A spring 52 around the upper end of the speeder rod K and compressed between a rigid arm K' thereof and a block portion (e. g. 15) of or in the governor casing supplements the force of the speeder spring in supplying the return direction force.

The input adjustments are effected by slave motor units 54 and 55 acting for example on opposite end portions of the floating lever 50 (e. g. unit 54 on effective lever arm 50a which is a whole multiple of the length of the effective lever arm 50b on which unit 55 acts). By movement of each end of such lever 50 into selected ones of four equally spaced positions (spaces greatly exaggerated in Fig. 2) and by selection of the differential lever arm length ratio (e. g.): 50a=twice 50b, permutations of the slave motor movements permit speed setting adjustment of the floating lever pivot point 51 through nine equal increment spaces seven of which (from indicated position 1 to position 8, Fig. 2) are used in the present instance as speed increasing and decreasing steps.

The slave motor unit mechanisms 54 and 55 are preferably exactly alike in construction, hence only one (54) will be described in detail. The solenoid-operated valves 56, 57, 58 and 59 which cause operation of the slave motor elements are also of identical construction. The valves preferably used (typical detail of valve 56 shown in Fig. 3) require only a few one hundredths of an inch of opening and closing movement, and are therefore well adapted for operation either to open or close them by short stroke, low power electro-magnets or solenoids.

Each valve has a biasing spring 60, Fig. 3 (equivalent tension springs 60' shown in Fig. 2) and is solenoid actuated from its normal spring biased position. Three of the valves (56, 57 and 58) in their normal position vent fluid from respective slave motor cylinders. The fourth valve (59) in its normal position is connected to its cylinder to cause fluid operation of the associated piston to its stroke-determining stop.

Slave motor unit 54 comprises a short stroke displacement element in the form of a piston 64 operatingly connected as by a push rod 65 to the effective end of lever arm 50a. Piston 64 is bourne by a longer stroke displacement element (piston 66) the bore 67 of the piston 66 serving as the working cylinder for piston 64. Longer stroke piston 66 slides in a cylinder bore 68 of the casing block 15. The push rod 65 may be guided by a bushing (not shown) or its ends may occupy precision sockets (not shown) in the lever 50 and short stroke piston 64 or the push rod may be an integral part of the piston (not shown). The type of manufacturing used determines the selection of the most appropriate design. The top of cylinder bore 68 is dead ended generally to close it.

The short stroke piston of slave motor unit 55 is designated 74 and its cylinder-constituting longer stroke piston 76. Otherwise the parts of unit 55 are indicated by the same characters as used for unit 54.

The strokes of the pistons can be precision-adjusted at each end if desired. However, as shown, the upward short strokes of pistons 64 and 74 are limited by adjusting screws 78 which are accessible through the top of the block 15. Similarly the upward strokes of pistons 66 and 76 are limited by adjusting screws 80 in the head portions of the cylinders of those pistons. As shown in Fig. 2 the adjusting screws 80 are threaded sleeves closed by suitable plugs 80' for enabling accessibility of adjustment screws 78. The downward strokes of the pistons are, for example, limited by snap rings 79 and 81 as clearly shown.

Subject to precision-adjustment such as described the strokes of piston 64 and 74 are (e. g.) one-half the lengths of the strokes of pistons 66 and 76 respectively. Thereby the pistons 64 and 74 can increase and decrease the effective stroke lengths of pistons 66 and 76 by half the stroke lengths of those pistons. Further each slave piston unit is capable of moving the connected portions of the lever 50 through three equal spaces or to the four definite floating-lever-adjusting positions illustrated. The manner in which the piston strokes and combinations of them operate to obtain the desired precise speeder adjustment increments will be explained later.

The set of solenoids A, B, C and D control respective valves for the slave motor units. The valves 56, 57 and 58 are operated by energization of solenoids A, B, and C (valves "on") to admit pressure fluid to the chambers of the respective pistons from line 13, Fig. 1 (spurtwise flow) and to vent fluid from the chambers (valves "off") when the solenoids are deenergized as will be clearly apparent from Fig. 2. Fluid from the valves 57 and 58 in their "on" positions is admitted directly to the tops of the main cylinder bores 68. Fluid from the valve 56 when in "on" position passes to the upper end of cylinder bore 67 through a hole 67a or series of holes in the wall of the hollow piston 66 between its upper and lower lands.

A duct arrangement identical to that just described is provided for admitting fluid from a suitable pressure source, e. g. accumulator-connected line 12d Fig. 1, to the working chamber of short stroke piston 74 via valve 59, but, as already noted in reference to Fig. 2, the chamber of piston 74 is vented when its associated valve control solenoid D is energized. That allows routine shutdown action through the energization of a single solenoid. In other words, valve 59 while constructed identically with the other valves is operated reversely thereof by its connected solenoid so far as causing "on" and "off" valve operation is concerned. Thus simultaneous energization of solenoids A and C causes additive action of the two associated pistons 64 and 66 for maximum distance of operation of the associated end of the floating lever but simultaneous energization of solenoids B and D (valve 57 "on"; 59 "off") causes a subtractive action of short stroke piston 74 on the long stroke of piston 76 in reference to the floating lever.

Operation of the solenoids controlling the valves 56—59 in proper sequence for step-by-step increase and decrease speed operation of the engine through the governor is usually accomplished by a manually operated control drum 84 having a contactor plate of suitable contour. The drum is assumed to be moved toward the left with respect to stationary contacts for increased speed settings of the speeder spring J. The relative position of the various solenoid-connected contacts A'B'C'D' and the drum in Figure 1 (all solenoids deenergized), results in an idle speed setting of the engine. That permits starting and idling operation of the engine at times when the electrical signal system is disconnected from its power source. Fig. 2 shows the "stop" position of the control drum 84, whereby solenoid D only is energized in order to position valve 59 for venting fluid from the working chamber of piston 74. In the "stop" position, the right hand end of the floating differential lever is moved up to point D" and the speeder rod K is lifted by spring 52 to its uppermost position in which the dump valve P" operates to vent fluid from line 37 of the shutdown valve Q to cause engine shutdown.

At the #1, idle speed, position of the control drum 84 (all solenoids deenergized as already stated) fluid (e. g.) from governor-accumulator-connected line 12d operates short stroke piston 74 to bring the right hand end of the floating lever 50 to the position designated OO in Fig. 2, the left hand end of the lever remaining in position O'O' as illustrated in both Fig. 1 and Fig. 2. At the #2 position of the control drum solenoid A only is energized, resulting in movement of the left end of the floating lever to position A". At #3 position solenoid A is deenergized and C is energized resulting in associated lever end position C". Simultaneous energization of solenoids A and C at drum position #4 results in the mutually additive movement of the two pistons 64 and 66 on the left end of the lever to move it to the point A"C". In the #5 control drum position solenoid C is energized bringing the left hand end of the floating lever 50 to C"; solenoid B is energized causing long stroke downward movement of piston 76 (right Fig. 2) and solenoid D is reenergized causing the inner piston 74 to move upwardly (Fig. 2 illustrated position or subtractively relative to the direction of movement of piston 76) so that the right hand end of the floating lever is arrested at B"D". In the #6 control drum position, solenoid A is energized in addition to the others which remain energized, causing piston 64 only to move downwardly in its carrier piston 66 for further lowering of the left end of the floating lever to A"C". The next position (#7) of the control drum deenergizes solenoid A permitting piston 64 to move upwardly (subtractively) in its carrier piston 66; deenergizes solenoid D to cause additive movement of piston 74 in piston 76, and solenoid B remains energized as in position #6. The final #8 control drum position energizes solenoid A in addition to solenoids B and C which were energized in the #7 position, whereby the left end of the floating lever is moved from C″ to A″C″.

*Engine lubrication system failure shutdown (automatic shutdown)*

Referring to Fig. 1, subject system through operation of detector mechanism T automatically effects shutting down of the engine in event (a) the engine lubricating oil system output pressure drops to a predetermined, i. e. dangerously low value in relation to engine speed and (b) the lubricating oil pump intake absolute pressure drops to a predetermined abnormally low value (excessive pump suction). The lubricating-oil-failure-responsive shutdown operation, as already mentioned, needs to be delayed in order to permit routine starting; and the engineer or operator should be enabled to re-start the engine after shutdown and operate it at low speed for brief periods such as will enable study of the cause of lubricating oil system failures.

The lubricating oil failure detector mechanism T acts through a rod 90 to control a valve 91 operable from its normal illustrated position in which its chamber vented at 91a into a lowered position (not shown) wherein the vent 91a is closed and pressure fluid in a line 92 under control of fluid rate control valve U (upper left) is admitted to the two-speed motor unit P through line 92a. Assuming valve U is in its illustrated position when valve 91 is opened then slow or controlled rate movement of motor unit P results from subjection of its piston 93 to spurtwise fluid from line 13 until the piston 93 moves against its biasing spring 94, comes in contact with the right end of rod X (at adjustable section 95 thereof) shifting the rod to the left and opening the dump valve P′ to cause shutdown action of valve Q. If, instead, the plunger of valve U is lowered to point such as will cut off spurtwise fluid line 13 and open line 92 to governor oil main line 12 then the motor unit P works at its high speed rate in initiating shutdown.

The working chamber of motor unit P has to be vented after operation of piston 93 thereof into contact with shutdown rod X in order to enable re-starting of the engine after automatic shutdown has taken place since shutdown means (e. g) zero lubricating oil pressure which permits valve 91 to close the vent 91a. An adjustable bleeder vent 93a is connected to line 92a to control the rate of piston return. Alternatively the bleeder 93a can be designed to adjust the idle period of the motor P after admission of operating fluid thereto through valve 91 by varying the rate of operating-fluid-subtractive leakage from the motor chamber.

The fluid rate control valve U, in order to be actuated from its normal low rate (spurtwise) fluid supplying position into high rate supplying position as a function of all engine speed setting adjustments above a suitable minimum speed, is conveniently arranged as a plunger 96 adjacent speed setting valve unit 54 and having an operating abutment engageable by outer piston 66 of said unit (controlled by solenoid C, Fig. 2) which piston moves downwardly a considerable distance and with considerable force to produce speed setting step #2—#3 as already described. That piston 66 remains in its lowered position for all subsequent increased speed setting steps. The motion imparted to the valve plunger 96 against the return force of its biasing spring 97 is sufficient to enable complete cutting off of spurtwise fluid at port 96a before port 96b connected to the continuous governor oil line 12 is opened.

*Detector mechanism (T)*

Referring further to the lubricating oil system failure detector mechanism T, that mechanism is also principally located in casing portion 15 and comprises the two motive units T′ and T″ both operatingly connected to valve rod 90 by lever 99 for controlling the described automatic shutdown action through valve 91. The motive units T′ and T″ are of similar construction embodying diaphragms 100 and 101 normally resting on appropriate abutments. The diaphragms form effective closures respectively for lubricating-oil-system connected pressure chamber 102 and lubricating-oil-pump-connected suction chamber 103.

Diaphragm 100 of detector mechanism T moves downwardly in response to critically low lubricating oil pressure due to unbalance between the spring device V acting on the upper side of the diaphragm and the lubricating oil pressure acting on the lower side. Equilibrium between spring force and the varying oil pressure is normally substantially maintained by increase and decrease of compression on the spring V in accordance with the positions of the speeder rod K as already noted. The downward motion of diaphragm 101 is resisted by an adjustable spring 104. The described engine shutdown operation through actuation of valve 91 is accomplished through functioning of whichever one of the units T′ or T″ detects a failure or undesired condition of the lubricating system. The non-active unit T′ or T″ meanwhile establishes a fulcrum for the lever 98.

It will be apparent from the above that the delay period afforded by admission of spurtwise fluid to the two speed motor P at low speed settings of the governor speeder spring enables the engine to be started by delaying the described shutdown action until normal engine lubricating oil pressure has had time to become established.

*Emergency hand shutdown: alarm switch*

The composite rod X of emergency hand shutdown and alarm switch mechanism W has a manipulatable part, e. g. plunger 108 with an operating knob outside the governor case, by which the rod X may be either pulled out or pushed in manually from its illustrated position in order to work the dump valve P′ and for reset after automatic or emergency shutdown. Center section 110 of rod X constitutes the plug of valve P′ which enables venting of line 37 of shutdown valve Q through port 111 when said section is moved outwardly as by the described automatic shutdown operation or manually and through port 112 when the rod is moved inwardly or toward motor unit P. Plunger 108 has a one way operating yielding connection (relatively stiff spring 114) with the center section of the rod, the spring preventing the operator from overriding the motor P when piston 93 thereof is in shutdown initiating contact with rod section 95.

When the rod X is moved outwardly by automatic shutdown motor unit P the rod closes an electrical alarm switch 115 through abutment of the rod at 116 with the operating arm 117 of the switch. The switch has a conventional spring toggle mechanism (not shown) for retaining switch arm 117 in its "on" and "off" positions which incidentally serves to hold the rod in its illustrated position and that occupied by the rod when automatic shutdown operation has occurred (rod out or to the left). In order that the operator cannot damage the switch arm 117 by emergency hand shutdown performed by inward movement of plunger 108 (switch arm then in "off" position) the effective abutment between the rod section 110 and one side of the switch arm is in the form of a light coilspring 118.

The adjustment 129 between rod sections 95 and 110 enables variation of the period of time required by the piston of motor P, after opening of valve 91, in order for the piston to cause automatic shutdown, being thus capable of modifying the inactive time period enabled by varying fluid leakage from line 92a through the bleeder 93a.

*Electrical load control (mechanism N; Fig. 1)*

This hydraulic mechanism, motor 125 thereof, through action of load control valve 126 adjusts the electrical loading or load carrying capacity of the generator (not shown) by varying its excitation resistance 127 shown in the more or less conventional (i. e. compact) form of an angularly adjustable rheostat.

The load control valve 126, the specific operation of which will be described later, is adapted for actuation as a combined function of engine fuel regulation by the governor servomotor H and engine speed setting through the governor (speeder rod K). The plug 134 of the load control valve is connected by a link 140 to an intermediate point 141 on a floating lever 142, one end of which is connected as at point 143 to the speeder rod K (e. g. arm K'), the opposite end being connected at point 144 to linkage 145, 146 arranged, in effect, to be operated in opposite directions by the governor servomotor H.

The load control valve 126 is normally maintained in its illustrated neutral position by the floating lever 142. For a given speed setting, change of generator load causes valving motion of the load control valve by normal governor fuel regulating servo motion. The load control valve 126 is so connected to the load control motor 125 that action of the motor is such as to counteract the generator load change that has taken place. Motor action (125) will continue until, through normal governor action, the governor fuel regulating servo motor H has returned the load control valve 126 to its neutral position.

In event of a change in speed setting adjustment (speeder rod K) valving action of the load control valve 126 will cause, through the load control motor 125, a change of generator loading in the same direction as the speed change until, through normal action of the governor fuel regulating servo H, the load control valve is returned to its neutral position. Thus for each position of the speed setting mechanism with a neutral load control valve position there is a corresponding governor fuel regulating servomotor position.

The hydraulic control motor 125 has a relatively small piston 125a continually mechanically interconnected with a relatively larger piston 125b by a toothed pinion 129 meshing with rack tooth formations on the respective pistons to convert the mutually reciprocal motions of the pistons into the necessary angular motion of the movable element of rheostat 127. One end of the smaller piston 125a is continually connected at 130 to governor oil line 12c and the corresponding end of larger piston 125b is connected by line 131 to the valve chamber 133 of the load control valve 126. The valve plunger 134 of valve 126 has lower and upper lands, 135 and 136 respectively, normally blocking admission of operating fluid to the working chamber of the larger piston 125b and blocking egress of fluid from the valve chamber to sump.

If the valve chamber 133 is connected for operation of motor 125 to the spurt system (e. g. line 13 via 139) that provides controlled, or relatively slow, motion of the load control motor 125 in the direction to increase generator excitation without having to throttle or restrictedly orifice any of the load control motor fluid lines. On the other hand free venting of fluid from the chamber of motor piston 125b through sump-connected port 136a enables rapid travel of the load control motor in the decreased excitation direction under the action of governor oil on small piston 125a. Thereby the generator excitation adjustment cannot be increased at such a rate as will endanger the locomotive draft equipment and at the same time de-excitation will be accomplished quickly enough so that (in the absence of interlock between the load control motor and manually operated electrical transition mechanism, see next heading) the operation will not be apt to damage the switch points by closing them before de-excitation has occurred. Incidentally, controlled motion of the load control mechanism N in a decreased excitation direction can be accomplished without provision of line restrictions by routing fluid from vent port 136a of load control valve 126 through a spurt system operating on the order of mechanism S which could also be operated by shaft 11.

*Transition operation*

When the locomotion electrical system is designed to enable changing from one type of traction motor connections to another it is necessary that generator excitation be reduced to some low value in order to avoid arcing at the contact points. The operators electrical controls (not shown) for effecting such change energizes a solenoid 150 of transition valve 151 designed temporarily to overcome the action of floating lever 142 on the load control valve 126 in the necessary direction to cause decreased excitation operation of the load control motor 125 to take place. The present arrangement is one in which the transition valve (by solenoid actuated movement of its plug 152) admits governor oil from line 153 to a chamber 155 below the load control valve plunger land 135 thus to raise the plunger and dump fluid from the regulating chamber of load control motor piston 125b.

In order that transition operation will not interfere with the normal speed setting and governor fuel servomotor action through the floating lever 142 the connection at 144, for example, between the floating lever 142 and link 145 can be made with one way lost motion as illustrated. Suitable adjustments at points 141 and 144 on the floating lever 142 can be arranged as in application Ser. No. 163,115 and for the reasons therein explained.

I claim:

1. A system for precise step-by-step power positioning of a work element, comprising a set of master valves, each valve being operable to an "on" and an "off" fluid controlling position, a corresponding set of electro-magnetically operating devices and means to energize and de-energize them singly and in combinations for so operating the valves, two slave motor mechanisms each having two pressure responsive displacement members individually controlled by separate ones of the valves and having respective means limiting the motions of the displacement members to different length strokes one length being a multiple of the other, one member having a lost motion mechanical connection with its cooperating member such that the valve controlled motions of the two members may be transmitted singly and in combination (in the latter case the motion of the one through the intermediary of the other), and a floating differential lever connected for operation at two spaced points with respective such other slave motor members and at a third point with the work element.

2. A system for precise step-by-step power positioning of a work element, comprising a set of master valves, each valve being operable to an "on" and an "off" fluid controlling position, a corresponding set of electro magnetically operating devices and means to energize and de-energize them singly and in combinations for so operating the valves, two slave motor mechanisms each having two pressure responsive displacement members individually controlled by separate ones of the valves and having respective means limiting the motions of the displacement members to different length strokes one length being a multiple of the other, the member with the shorter stroke having a lost motion mechanical connection with the longer stroke member whereby the valve controlled motions of the two members may be transmitted singly and in combination (in the latter case the motion of the longer stroke member through the intermediary of the shorter stroke member, and a floating differential lever connected for operation at two spaced points with the two shorter stroke members and at a third point with the work element.

3. A system for translating relatively weak electrically transmitted signal impulses into corresponding precise power stroke adjustments of a work element; comprising a floating differential lever a fixed point on which establishes a pivotal operating connection with the work element for stepwise movement of the element by the lever, two fluid operated motor units each including a power output member connected with the lever at respective points there along such that combinations of relatively equal stroke movements of said points can effect a succession of different length, relatively equal movements of the work-element-connection point, the power output member of each unit being displaceable by fluid a predetermined definite lever-operating stroke length in respect to a fluid-displaceable carrier for the output member which in turn is guided for a different length lever-operating stroke movement, movements of the carrier being thereby imparted to the lever through the output member, and operating fluid supply means including separate electro-magnetically operated fluid routing valves and displacement chambers controlled thereby for operation of the output members and carrier members.

4. The system according to claim 3 wherein the stroke length of the carrier member of each motor unit is twice the stroke length of the output member thereof.

5. A system for translating electrically transmitted signal impulses into a succession of precise approximately equal length power adjustments of a work element; comprising a floating differential lever having pivot establishing means for connection to the work element, two fluid operable mechanisms each including a plural concentric piston and cylinder unit wherein one piston of the unit constitutes a cylinder for another piston thereof, such other piston of each unit being connected to the lever and the connections of the two units being different distances along the lever from the work element pivot-establishing means, one of which distances is a multiple of the other distance, and fluid supply means including an "on" and "off" solenoid-operated valve for each piston of each unit, one piston of each unit having twice the stroke length of the other piston of that unit, whereby each unit is capable of moving its connected portion of the lever into three equally spaced positions.

6. The system according to claim 5 wherein the stroke of the cylinder-constituting piston of each said unit is twice the length of the stroke of the other piston.

7. As a means for operating a floating lever which is pivotally connected to a work element for incremental adjustment thereof in steps, two spring biased piston/cylinder units each comprising a tubular piston serving as a cylinder for a second piston, and a fixed cylinder for the tubular piston; the second piston of the two units being connected to the lever at points spaced different distances from the pivotal connection of the lever with the work element, and a set of electro-magnetically operated "on"-"off" valves with cooperating duct means arranged to supply fluid individually to the cylinders and to enable exhaust of fluid therefrom.

8. As a means for operating a floating lever which is pivotally connected to a work element for incremental adjustment thereof in steps, two spring biased piston/cylinder units each comprising a long stroke tubular piston serving as a cylinder for a short-stroke piston, and a fixed cylinder for the long stroke piston; the short-stroke piston of the two units being connected to the lever at points spaced different distances from the pivotal connection of the lever with the work element, and a set of electro-magnetically operated "on"-"off" valves with cooperating duct means arranged to supply fluid individually to the cylinders and to enable exhaust of fluid therefrom.

9. A positioning system for a work element having a point requiring stepwise movement in approximately equal increments, a floating differential lever connected to the work element at said point and having unequal length effective arms and length of one being a multiple of the length of the other, two fluid motor devices for operating the respective arms to produce such incremental motion of the work element, each motor device having a first displacement member acting directly on its associated lever arm and a second displacement member acting on the same arm through the intermediary of the first displacement member, the displacement members of each device having unequal length strokes one a multiple of the other, and valve mechanism for controlling the operation of fluid individually in respect to each displacement member.

10. A positioning system for a work element having a point requiring movement stepwise in one direction from a starting position and movement comparable to at least one step in the opposite direction, all of which movements are initiated by electrically transmitted signals; a floating differential lever connected to the work element at said point, two fluid motor devices for operating respective arms of the lever to produce such motions of said element in response to reception of the signals, each motor device having a first displacement member acting directly on its associated lever arm and a second displacement member acting on the same arm through the intermediary of the first displacement member, and solenoid operated valves for individually controlling fluid routing for operation of the displacement members, occupation of the starting position of the work element resulting from de-energization of all the solenoids.

LLOYD JACKSON MOULTON.

No references cited.